US012708941B2

(12) United States Patent
Ishii

(10) Patent No.: US 12,708,941 B2
(45) Date of Patent: Aug. 18, 2026

(54) THREE-DIMENSIONAL ADDITIVE MANUFACTURING DEVICE, CONTROL METHOD, AND PROGRAM

(71) Applicant: NIDEC MACHINE TOOL CORPORATION, Ritto (JP)

(72) Inventor: Koh Ishii, Ritto (JP)

(73) Assignee: NIDEC MACHINE TOOL CORPORATION, Ritto (JP)

( * ) Notice: Subject to any disclaimer, the term of this patent is extended or adjusted under 35 U.S.C. 154(b) by 649 days.

(21) Appl. No.: 17/914,476

(22) PCT Filed: Feb. 25, 2021

(86) PCT No.: PCT/JP2021/007158

§ 371 (c)(1),
(2) Date: Sep. 26, 2022

(87) PCT Pub. No.: WO2021/199806

PCT Pub. Date: Oct. 7, 2021

(65) Prior Publication Data

US 2023/0117445 A1 Apr. 20, 2023

(30) Foreign Application Priority Data

Mar. 30, 2020 (JP) ................................ 2020-061230

(51) Int. Cl.

*B22F 10/85* (2021.01)
*B22F 12/00* (2021.01)
*B22F 12/90* (2021.01)

(Continued)

(52) U.S. Cl.

CPC ............ *B22F 10/85* (2021.01); *B22F 12/222* (2021.01); *B22F 12/90* (2021.01); *B33Y 10/00* (2014.12); *B33Y 30/00* (2014.12); *B33Y 50/02* (2014.12)

(58) Field of Classification Search

CPC ........ B22F 10/85; B22F 12/222; B22F 12/90; B22F 12/44; B22F 2999/00; B22F 10/25;

(Continued)

(56) References Cited

U.S. PATENT DOCUMENTS

2004/0251242 A1* 12/2004 Suh ........................ B23K 26/34 219/121.64
2014/0163717 A1* 6/2014 Das ........................ C30B 13/28 700/119

(Continued)

FOREIGN PATENT DOCUMENTS

DE 10 2004 057 799 B4 5/2015
EP 3 881 857 A1 9/2021

(Continued)

OTHER PUBLICATIONS

International Search Report for PCT/JP2021/007158 mailed on Apr. 13, 2021.

*Primary Examiner* — Rebecca Janssen

(74) *Attorney, Agent, or Firm* — Birch, Stewart, Kolasch & Birch, LLP

(57) ABSTRACT

A three-dimensional additive manufacturing device manufactures a layered structure by supplying powder while changing the positional relationship between a discharge port from which the powder is discharged and the layered structure. The three-dimensional additive manufacturing device includes: a powder supply unit that supplies powder from the discharge port toward the layered structure; a light irradiation unit that irradiates the powder with a light beam to melt and harden the powder to thereby manufacture the layered structure; an imaging unit that captures an image of the manufacturing site; a distance detector that detects a distance from the manufacturing site to the powder supply unit on the basis of the image; and a feedback controller that (Continued)

adjusts a moving speed of the powder supply unit relative to the layered structure on the basis of a detection result of the distance.

9 Claims, 13 Drawing Sheets

(51) Int. Cl.

| | |
|---|---|
| ***B33Y 10/00*** | (2015.01) |
| ***B33Y 30/00*** | (2015.01) |
| ***B33Y 50/02*** | (2015.01) |

(58) Field of Classification Search

CPC ...... B22F 10/30; B22F 12/53; B22F 2203/03; B33Y 10/00; B33Y 30/00; B33Y 50/02; G01B 11/14; B23K 26/032; B23K 26/0853; B23K 26/144; B23K 26/1476; B23K 26/342; Y02P 10/25; B29C 64/153; B29C 64/393

See application file for complete search history.

(56) References Cited

U.S. PATENT DOCUMENTS

| | | | |
|---|---|---|---|
| 2017/0136545 | A1 | 5/2017 | Yoshimura et al. |
| 2020/0038954 | A1 | 2/2020 | Regulin et al. |

FOREIGN PATENT DOCUMENTS

| | | | | | |
|---|---|---|---|---|---|
| JP | 2005-509523 | A | | 4/2005 | |
| JP | 2010-530809 | A | | 9/2010 | |
| JP | 2013-119098 | A | | 6/2013 | |
| JP | 2014174101 | A | * | 9/2014 | |
| JP | 2019-112677 | A | | 7/2019 | |
| WO | WO 03/042895 | A1 | | 5/2003 | |
| WO | WO 2009/002638 | A1 | | 12/2008 | |
| WO | WO 2015/151839 | A1 | | 10/2015 | |
| WO | WO-2019151911 | A1 | * | 8/2019 | ........... B23K 26/032 |

* cited by examiner

THREE-DIMENSIONAL ADDITIVE MANUFACTURING DEVICE, CONTROL METHOD, AND PROGRAM

CROSS-REFERENCE TO RELATED APPLICATIONS

This is the U.S. national stage of application No. PCT/JP2021/007158, filed on Feb. 25, 2021, and priority under 35 U.S.C. § 119(a) and 35 U.S.C. § 365(b) is claimed from Japanese Patent Application No. 2020-061230, filed on Mar. 30, 2020; the disclosures of which are incorporated herein by reference.

FIELD OF THE INVENTION

The present disclosure relates to a three-dimensional additive manufacturing device, a control method, and a program.

BACKGROUND

In recent years, a layered structure forming method for forming a layered structure using powder such as metal powder as a raw material has been put into practical use. For example, there is an additive manufacturing device that supplies powder from a powder supply mechanism while emitting laser light from a laser light emission mechanism. In the additive manufacturing device, an output value of the laser light is feedback-controlled on the basis of an area of a molten pool in order to improve the manufacturing accuracy.

However, in the three-dimensional additive manufacturing device, unevenness may occur in powder supply such as the powder supply amount and the powder convergence diameter due to the shape of the powder supply path, deviation in the powder discharge amount, and the like. In such a case, even if the output value of the laser beam is controlled as in the describe above, the manufacturing accuracy may not be appropriately improved. Therefore, a three-dimensional additive manufacturing device capable of appropriately improving the manufacturing accuracy is required.

SUMMARY

In order to solve the above-described problems and achieve the object, an exemplary three-dimensional additive manufacturing device according to the present disclosure is a three-dimensional additive manufacturing device that manufactures a layered structure by supplying powder for manufacturing the layered structure while changing the positional relationship between a discharge port from which the powder is discharged and the layered structure. The three-dimensional additive manufacturing device includes a powder supply unit that supplies powder from the discharge port toward the layered structure; a light irradiation unit that irradiates the powder with a light beam to melt and harden the powder to thereby manufacture the layered structure; an imaging unit that captures an image of a manufacturing site where the layered structure is being manufactured; a distance detector that detects the distance from the manufacturing site to the powder supply unit on the basis of the image; and a feedback controller that adjusts the moving speed of the powder supply unit relative to the layered structure on the basis of a distance detection result.

The above and other elements, features, steps, characteristics and advantages of the present disclosure will become more apparent from the following detailed description of the preferred embodiments with reference to the attached drawings.

DETAILED DESCRIPTION

Hereinafter, preferred embodiments of the present disclosure will be described in detail with reference to the accompanying drawings. Note that the present disclosure is not limited by the embodiments, and in the case where there are a plurality of embodiments, the present disclosure includes a combination of the embodiments.

Figure 1:
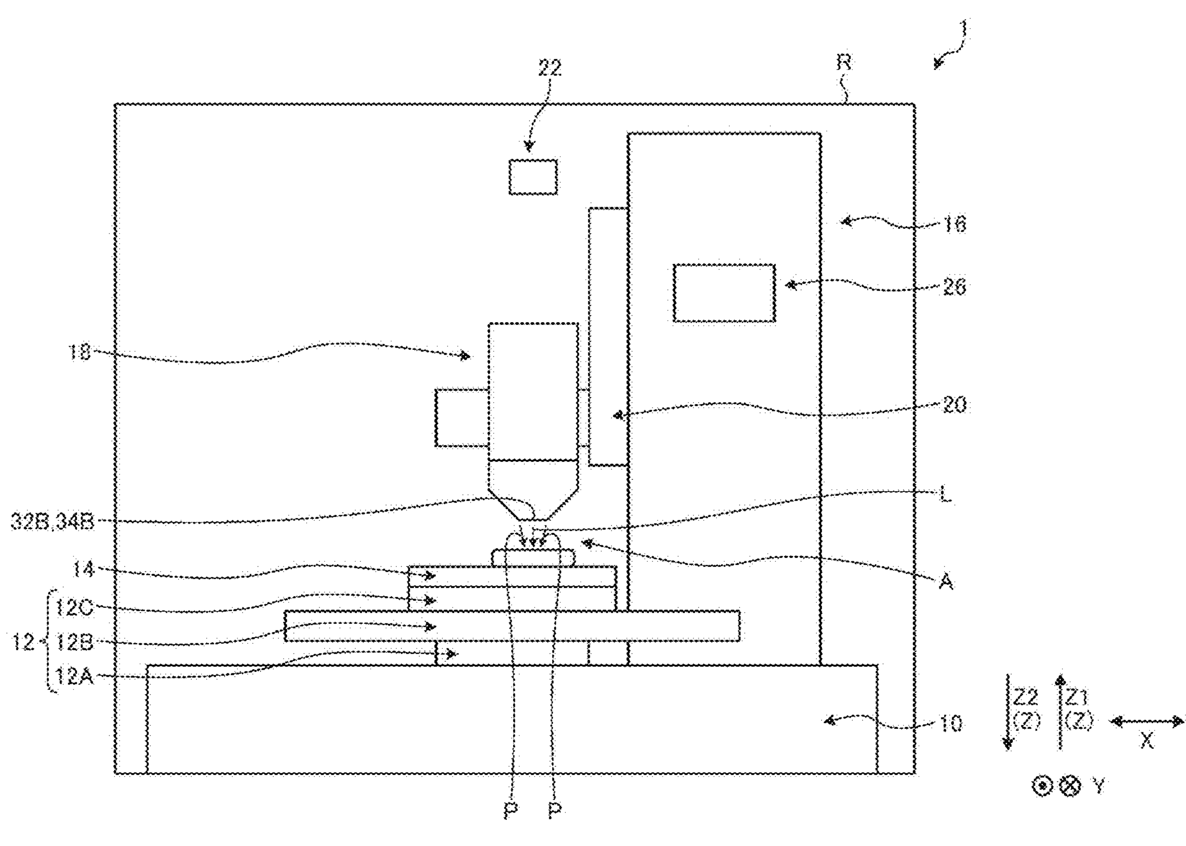
FIG. 1 is a schematic diagram of a three-dimensional additive manufacturing device of the present embodiment.

FIG. 1 is a schematic diagram of a three-dimensional additive manufacturing device of the present embodiment. Here, in the present embodiment, one direction in a horizontal plane is defined as a direction X, a direction orthogonal to the direction X in the horizontal plane is defined as a direction Y, and a direction orthogonal to each of the direction X and the direction Y, that is, a vertical direction, is defined as a direction Z. One of the directions along the direction Z is defined as a direction Z1, and the other of the directions along the direction Z, that is, a direction opposite to the direction Z1, is defined as a direction Z2. In the present embodiment, the direction Z1 is a direction directed upward in the vertical direction, and the direction Z2 is a direction directed downward in the vertical direction.

As illustrated in FIG. 1, the three-dimensional additive manufacturing device 1 includes, in a three-dimensional build chamber R, a platform part 10, a base moving part 12, a base part 14, a platform part 16, a layering head 18, a head moving part 20, an imaging unit 22, and a control device 26. The control device 26 may be provided outside the three-dimensional build chamber R.

The three-dimensional additive manufacturing device 1 is a device that forms a layered structure A, which is a three-dimensional object, on the base part 14. The three-dimensional additive manufacturing device 1 manufactures the layered structure A by supplying powder P for manufacturing the layered structure A while changing the positional relationship between a powder discharge port 34B from which the powder is discharged and the layered structure A. The base part 14 is a member serving as a base on which the layered structure A is formed. In the present embodiment, the base part 14 is a plate-shaped member. Note that the base part 14 is not limited to this. The base part 14 is a member that serves as a base of the layered structure A as a separate body from the layered structure A, but may be a member that is linked to the layered structure A to serve as a part of the layered structure A.

The platform part 10 is a platform that supports the base moving part 12, the base part 14, and the like. The base moving part 12 is provided on the platform part 10 and supports the base part 14. The base moving part 12 is a mechanism that moves the base part 14 under the control of the control device 26. The base moving part 12 includes a first moving part 12A, a second moving part 12B, and a rotation part 12C. The first moving part 12A is a mechanism that moves the base part 14 in a first direction along the horizontal direction (orthogonal to the vertical direction). In the present embodiment, the first moving part 12A moves the base part 14 along the direction Y. More specifically, in the present embodiment, the second moving part 12B, the rotation part 12C, and the base part 14 are arranged on the first moving part 12A, and the first moving part 12A moves the second moving part 12B, the rotation part 12C, and the base part 14 along the direction Y.

The second moving part 12B is a mechanism that moves the base part 14 in a second direction along the horizontal direction (orthogonal to the vertical direction), and the second direction is a direction orthogonal to the first direction. In the present embodiment, the second moving part 12B moves the base part 14 along the direction X. More specifically, in the present embodiment, the rotation part 12C and the base part 14 are disposed on the second moving part 12B, and the second moving part 12B moves the rotation part 12C and the base part 14 along the direction X. In the present embodiment, the first moving part 12A and the second moving part 12B are sliders that move the base part 14 placed on the upper part, but may be mechanisms other than sliders.

The rotation part 12C is a rotary table on which the base part 14 is disposed. The rotation part 12C rotates the base part 14 disposed thereon by rotating about at least one rotation axis. In the present embodiment, the rotation part 12C rotates the base part 14 about three rotation axes orthogonal to each other.

As described above, the base moving part 12 moves the base part 14 along the direction X and the direction Y by the first moving part 12A and the second moving part 12B, and rotates the base part 14 about the three rotation axes by the rotation part 12C. That is, the base moving part 12 is a five-axis moving mechanism that moves the base part 14 along two axes and rotates it about three rotation axes. However, the base moving part 12 is not limited to the five-axis moving mechanism, and may be, for example, a two-axis moving mechanism that moves the base part 14 along the direction X and the direction Y.

The platform part 16 is a pedestal provided in the three-dimensional build chamber R, and in the present embodiment, the head moving part 20 is provided.

In the present embodiment, the head moving part 20 is attached to the platform part 16. The head moving part 20 moves the layering head 18 along the direction Z. In the present embodiment, the head moving part 20 is a slider that moves the layering head 18, but may be a mechanism other than a slider. The head moving part 20 is not limited to be attached to the platform part 16, and the attachment position is arbitrary.

As described above, in the present embodiment, by moving the base part 14 (layered structure A) in the X direction and the Y direction by the base moving part 12, the positions of the layering head 18 in the X direction and the Y direction relative to the layered structure A are changed. In the present embodiment, the position of the layering head 18 in the Z direction relative to the layered structure A is changed by moving the layering head 18 in the Z direction by the head moving part 20. However, the method of changing the position of the layering head 18 relative to the layered structure A is not limited thereto, and for example, the layering head 18 may be moved in at least one direction of the X direction and the Y direction, or the layered structure A may be moved in the Z direction. That is, the three-dimensional additive manufacturing device 1 may change the position of the layering head 18 relative to the layered structure A by moving the layered structure A, may change the position of the layering head 18 relative to the layered structure A by moving the layering head 18, or may change the position of the layering head 18 with respect to the layered structure A by moving both the layered structure A and the layering head 18.

The layering head 18 is provided on the direction Z1 side of the base part 14, that is, on the vertically upper side of the base part 14. The layering head 18 forms the layered structure A on the base part 14 by irradiating the base part 14 with a light beam L from the light beam emission port 32B and discharging the powder P from the powder discharge port 34B toward the base part 14. That is, the three-dimensional additive manufacturing device 1 according to the present embodiment is a deposition-type three-dimensional additive manufacturing device including the layering head 18.

Figure 2:
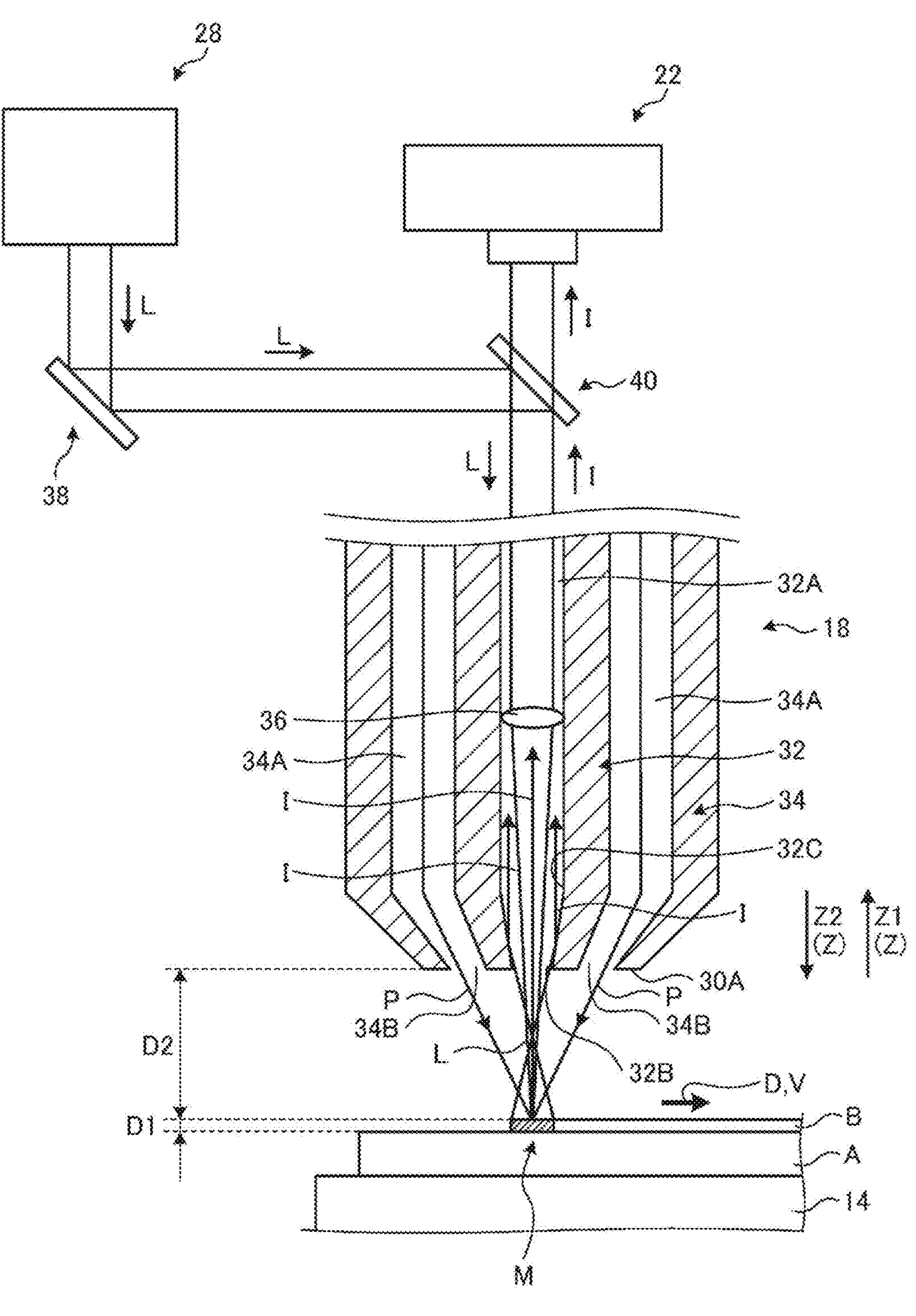
FIG. 2 is a schematic diagram of a layering head according to the present embodiment.

FIG. 2 is a schematic diagram of a layering head of the present embodiment. As illustrated in FIG. 2, the layering head 18 includes an inner tube 32 and an outer tube 34. The outer tube 34 is a tubular member, and has a diameter decreasing toward the tip, that is, the direction Z2. The inner tube 32 is also a tubular member, and has a diameter decreasing toward the tip, that is, the direction Z2. Since the inner tube 32 is inserted in the outer tube 34, the inner tube 32 and the outer tube 34 constitute a double pipe. In the layering head 18, a space inside the inner tube 32 becomes a beam path 32A through which a light beam L passes. In the layering head 18, a space between the outer peripheral surface of the inner tube 32 and the inner peripheral surface of the outer tube 34 is a powder passage 34A through which the powder P passes. That is, the powder passage 34A is a passage having a shape surrounding the periphery of the beam path 42A. In the present embodiment, the powder passage 34A is concentrically arranged on the outer periphery of the beam path 32A.

In the layering head 18, a light beam emission port 32B communicating with the beam path 32A is opened at an end 30 A on the direction Z2 side. That is, the light beam emission port 32B is an opening on the direction Z2 side of the beam path 32A. An optical element 36 is provided in the beam path 32A. The optical element 36 includes, for example, a collimating lens that collimates the light beam L, and a condenser lens that condenses the collimated light beam L. The layering head 18 is connected to a light source 28. The light source 28 is a light source that outputs the light beam L. The light beam L output from the light source 28 is reflected by mirrors 38 and 40 provided between the light source 28 and the beam path 32A, and is introduced into the beam path 32A. The light beam L travels in the beam path 32A toward the Z2 direction side, is condensed by the optical element 36, and is emitted from the light beam emission port 32B to the outside of the layering head 18. The light beam L emitted from the light beam emission port 32B travels in the direction Z2 and is emitted toward the base part 14.

In the layering head 18, a powder discharge port 34B communicating with the powder passage 34A is opened at the end portion 30A on the direction Z2 side. That is, the powder discharge port 34B is an opening on the direction Z2 side of the beam path 32A. The powder discharge port 34B is opened so as to surround the light beam emission port 32B. The powder passage 34A is connected to a powder storage mechanism (not illustrated) that stores the powder P, and the powder P is supplied from the powder storage mechanism. The powder P supplied into the powder passage 34A flows in the powder passage 34A in the direction Z2, and is discharged from the powder discharge port 34B to the outside of the layering head 18. The powder P discharged from the powder discharge port 34B travels in the direction Z2 and is discharged toward the base part 14.

Here, the powder P is discharged toward the base part 14 with a predetermined spot diameter, and the light beam L is emitted toward the base part 14 with a predetermined spot diameter. The powder P is melted by the heat of the light beam L and the heat of the layered structure A heated by the irradiation of the light beam L to form a molten pool M. It can be said that the molten pool M includes at least one of the molten powder P and the molten layered structure A. Since the base part 14 is moved with respect to the layering head 18, the position irradiated with the light beam L changes. Therefore, the portion where the molten pool M is formed by being irradiated with the light beam L is cooled and hardened by not being irradiated with the light beam L to form a bead B. The layered structure A is formed by three-dimensionally building the beads B. Hereinafter, a portion where the powder P is discharged with irradiation of the light beam L on the base part 14, that is, a portion where the bead B is formed, will be referred to as a manufacturing site. The manufacturing site includes at least a portion where the molten pool M is formed, and further includes the molten pool M and the bead B around the molten pool M.

As described above, in the present embodiment, the inner tube 32, in other words, the powder passage 34A and the powder discharge port 34B can be said to be a powder supply unit that supplies the powder P, and the outer tube 34, in other words, the beam path 32A and the light beam emission port 32B can be said to be a light irradiation unit that irradiates the powder P with the light beam L to melt and harden the powder P to form the layered structure A. That is, in the present embodiment, the powder supply unit and the light irradiation unit are integrally configured as the layering head 18. However, the powder supply unit and the light irradiation unit may be separate bodies. In addition, the light beam L in the present embodiment is a laser beam, but is not limited to a laser beam, and may be, for example, an electron beam. The powder P in the present embodiment is metal powder, but is not limited to metal powder.

In the present embodiment, the imaging unit 22 is an infrared camera that captures an image of infrared light I. The imaging unit 22 is, for example, an InGaAs camera. The imaging unit 22 is attached to the layering head 18, and the position thereof is fixed with respect to the layering head 18. As illustrated in FIG. 2, the imaging unit 22 is provided on the Z1 direction side of the layering head 18, and the optical axis of the imaging unit 22 is coaxial with the optical axis of the light beam L on the beam path 32A. The infrared light I is emitted from the manufacturing site (the molten pool M and the layered structure A around the molten pool M). The infrared light I travels in the Z1 direction in the beam path 32A from the light beam emission port 32B. A mirror 40 reflects the light beam L but transmits the infrared light I, so that the infrared light I passes through the mirror 40 and enters the imaging unit 22. The imaging unit 22 can capture an image of the manufacturing site by capturing an image of the infrared light I. The wavelength of the infrared light I detected by the imaging unit 22 is, for example, 0.75 μm or more and 1000 μm or less, and more preferably, for example, near infrared light having a wavelength of about 0.75 μm or more and 1.4 μm or less. Note that the position where the imaging unit 22 is provided is not limited to the position described above, and may be any position. Furthermore, the imaging unit 22 is not limited to an infrared camera.

Figure 3:
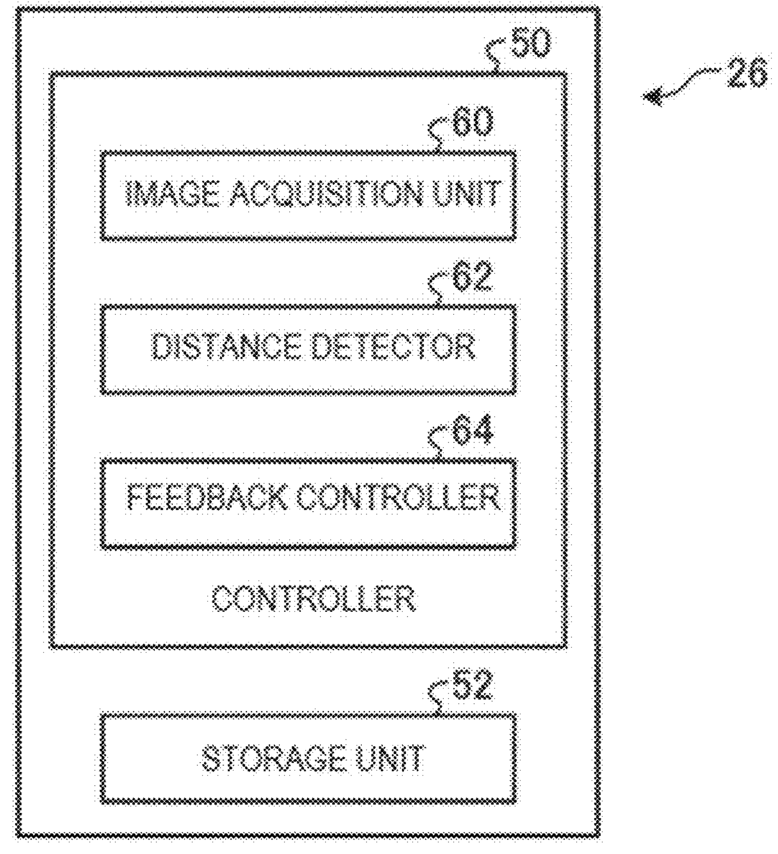
FIG. 3 is a block diagram of a control device according to the present embodiment.

The control device 26 is a device that controls the three-dimensional additive manufacturing device 1, that is, a computer in this example. FIG. 3 is a block diagram of a control device according to the present embodiment. As illustrated in FIG. 3, the control device 26 includes a control unit 50 and a storage unit 52. The storage unit 52 is a memory that stores operation content of the control unit 50, information of a program, and the like, and includes at least one of, for example, a random access memory (RAM), a read only memory (ROM), and an external storage device such as a hard disk drive (HDD).

The control unit 50 is an arithmetic device, that is, a central processing unit (CPU). The control unit 50 includes an image acquisition unit 60, a distance detector 62, and a feedback controller 64. The control unit 50 reads and executes a program (software) from the storage unit 52 to implement the image acquisition unit 60, the distance detector 62, and the feedback controller 64, and executes these processes. Note that the control unit 50 may execute processing by one CPU, or may include a plurality of CPUs and execute processing by the plurality of CPUs. In addition, at least one of the image acquisition unit 60, the distance detector 62, and the feedback controller 64 may be realized by a hardware circuit. Specific processing contents of the image acquisition unit 60, the distance detector 62, and the feedback controller 64 will be described later.

As illustrated in FIG. 2, the three-dimensional additive manufacturing device 1 configured as described above forms the bead B extending in one direction by moving the position of the layering head 18 with respect to the base part 14 in one direction along the horizontal direction while emitting the light beam L and discharging the powder P. Then, the three-dimensional additive manufacturing device 1 forms the layered structure A by building the beads B in the Z direction. Hereinafter, a direction in which the bead B extends, that is, one direction in which the position of the layering head 18 moves with respect to the base part 14 is referred to as a feeding direction D. The feeding direction D is, for example, a direction along the X direction or the Y direction. In the present embodiment, the position of the layering head 18 with respect to the base part 14 is moved in the feeding direction D by moving the base part 14, but the present disclosure is not limited thereto as described above, and the base part 14 may be moved, or both the base part 14 and the layering head 18 may be moved.

Here, in the three-dimensional additive manufacturing device, unevenness may occur in supply of the powder P such as the supply amount of the powder P and the convergence diameter of the powder P due to the shape of the powder supply path, the discharge amount of the powder P, and the like. In such a case, the height D1 of the bead B cannot be maintained at an appropriate height, and the manufacturing accuracy may decrease. The height D1 of the bead B refers to the length of the bead B in the Z direction as illustrated in FIG. 2. To cope with it, the control device 26 according to the present embodiment performs feedback control of the moving speed of the layering head 18 with respect to the base part 14 in the feeding direction D (that is, the relative speed of the layering head 18 with respect to the base part 14) during manufacturing to absorb the unevenness of the supply of the powder P and maintain the height D1 of the bead B at an appropriate height, and can appropriately improve the manufacturing accuracy. Hereinafter, the moving speed of the layering head 18 with respect to the base part 14 in the feeding direction D is referred to as a feed speed V.

The control device 26 detects a distance D2 from the manufacturing site to the layering head 18 (powder supply unit) from an image captured by the imaging unit 22, and controls the feed speed V on the basis of the detected distance D2. As illustrated in FIG. 2, the distance D2 refers to a distance in the Z direction between the manufacturing site and the end portion 30A of the layering head 18 (powder supply unit). The position in the Z direction of the end portion 30A of the layering head 18 is set in accordance with the position in the Z direction of the base part 14 so that the light beam L and the powder P from the layering head 18 appropriately converge at the manufacturing site. Therefore, D2 from the manufacturing site to the layering head 18 depends on the height D1 of the bead B. That is, when the height D1 of the bead B is low, the distance D2 becomes long, and when the height D1 of the bead B is high, the distance D2 becomes short. Therefore, it can be said that the control device 26 estimates the height D1 of the bead B by detecting the distance D2, and feedback-controls the feed speed V on the basis of the detection result of the distance D2. A more specific description will be given below.

The image acquisition unit 60 of the control device 26 controls the imaging unit 22 to cause the imaging unit 22 to capture an image of the manufacturing site, and acquires an image K captured by the imaging unit 22. The image acquisition unit 60 causes the imaging unit 22 to perform imaging at predetermined time intervals, thereby acquiring the images K captured at predetermined time intervals. Here, as illustrated in FIG. 2, a part of the infrared light I from the manufacturing site (the molten pool M and the layered structure A around it) travels straight in the Z1 direction in the beam path 32A and reaches the imaging unit 22, but the other part of the infrared light I is reflected by an inner peripheral surface 32C of the inner tube 32 and enters the imaging unit 22. The imaging unit 22 also captures an image of the infrared light I reflected by the inner peripheral surface 32C and reaching the imaging unit 22 in this manner. That is, the imaging unit 22 captures an image of the infrared light I traveling straight in the Z1 direction through the light beam emission port 32B, that is, an image of the infrared light I that has reached the imaging unit 22 without being reflected by the inner peripheral surface 32C, and an image of the infrared light I that has reached the imaging unit 22 after being reflected by the inner peripheral surface 32C. The image of the infrared light I that has not been reflected by the inner peripheral surface 32C and has reached the imaging unit 22 is an image in a region inside the outer periphery of the light beam emission port 32B, and can be said to be an image of the manufacturing site (the molten pool M or the layered structure A around it). The image of infrared light I reflected by inner peripheral surface 32C and reaching the imaging unit 22 can be said to be an image of the inner peripheral surface 32C. Hereinafter, in the image K captured by the imaging unit 22, a region in which an image of a region inside the light beam emission port 32B is captured, that is, a region in which a manufacturing site is captured, is referred to as an inner region AR1, and a region in which an image of the inner peripheral surface 32C is captured is referred to as an outer region AR2.

Figure 4:
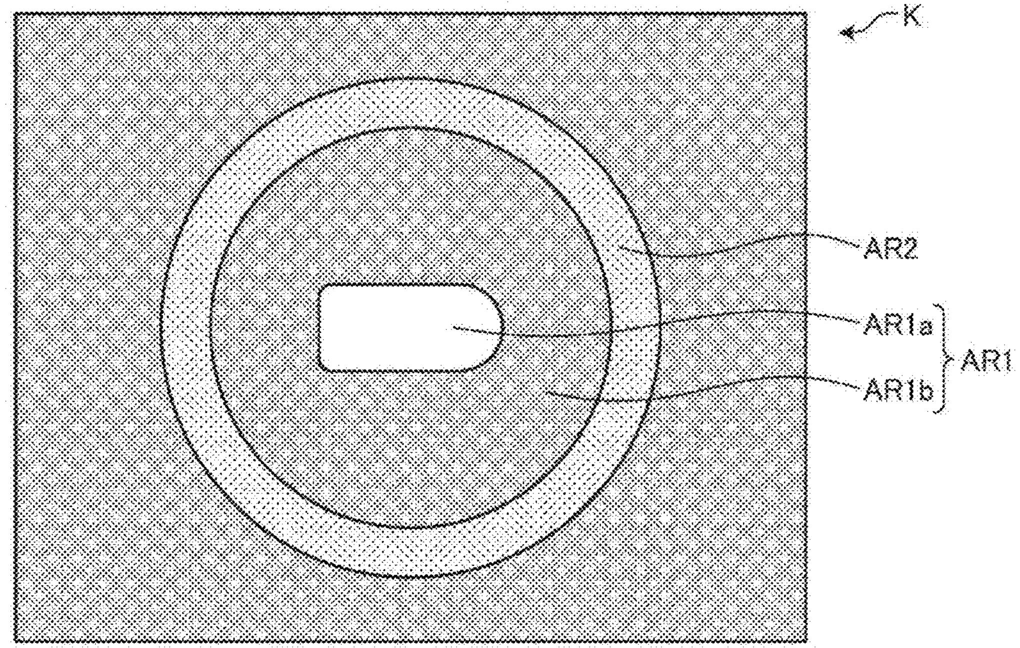
FIG. 4 is a schematic diagram illustrating an exemplary image captured by an imaging unit.
Figure 5:
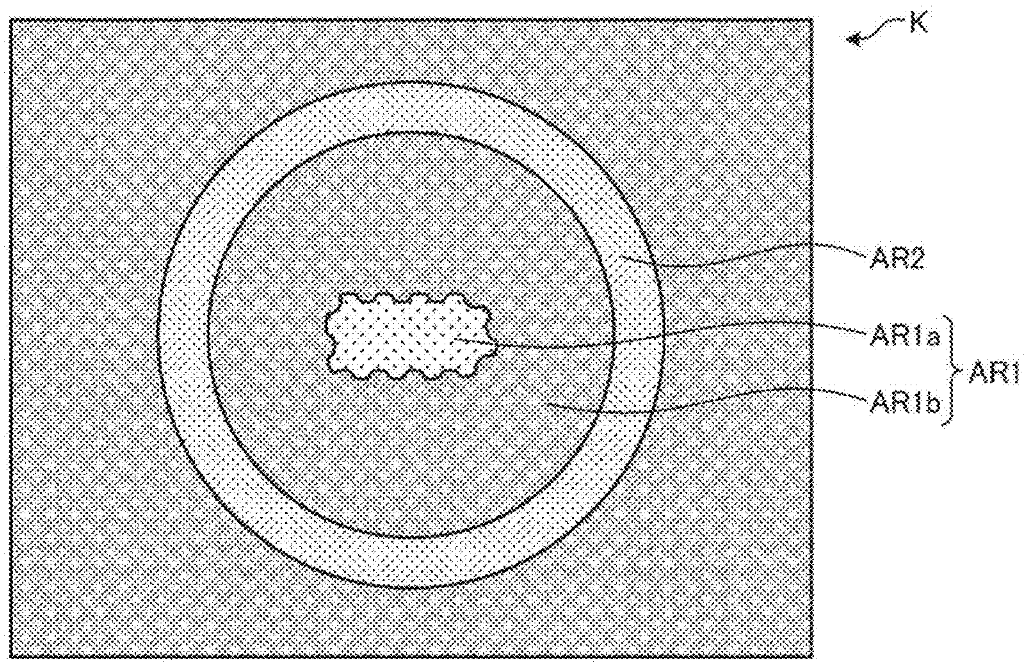
FIG. 5 is a schematic diagram illustrating an exemplary image captured by an imaging unit.
Figure 6:
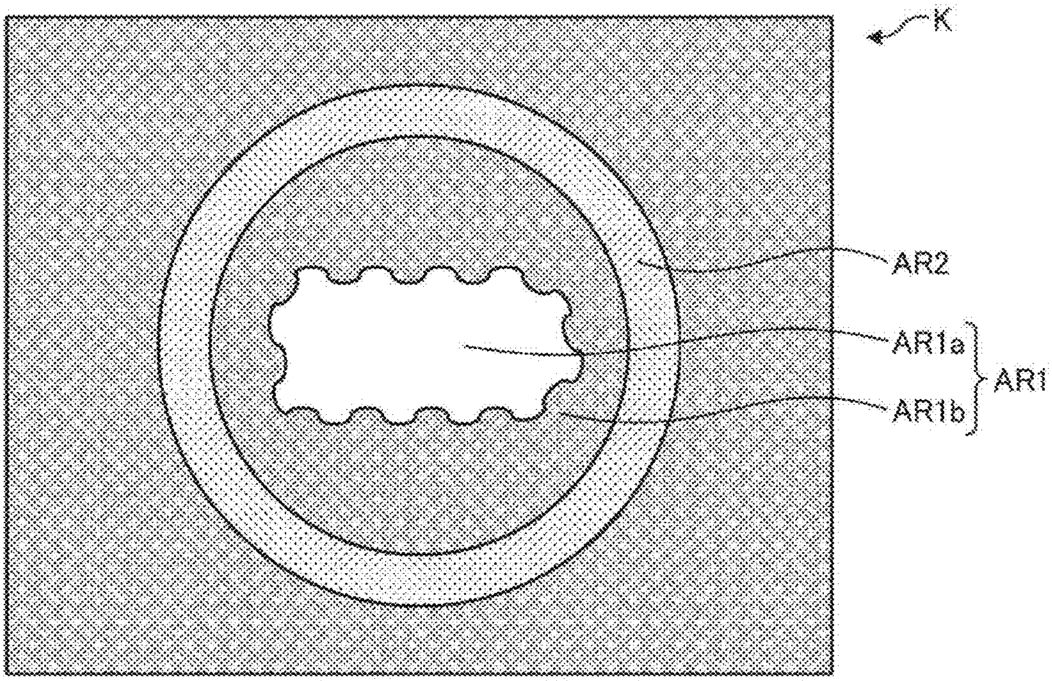
FIG. 6 is a schematic diagram illustrating an exemplary image captured by an imaging unit.

FIGS. 4 to 6 are schematic diagrams illustrating exemplary images captured by the imaging unit. As illustrated in FIG. 4, the image K includes the inner region AR1 in which an image of a manufacturing site inside the light beam emission port 32B is captured and the outer region AR2 in which an image of the inner peripheral surface 32C is captured. The inner region AR1 includes a manufacturing site region AR1*a* in which the manufacturing site is captured, and a peripheral region AR1*b* having low luminance around the manufacturing site region AR1*a*. Since the manufacturing site including the molten pool M has a high temperature, the manufacturing site region AR1*a* in which the manufacturing site is shown has high luminance. On the other hand, since a portion in which the temperature is lowered is shown in the periphery of the manufacturing site, the peripheral region AR1*b* has luminance lower than that of the manufacturing site region AR1*a*. The outer region AR2 is formed so as to surround the inner region AR1. Since the outer region AR2 is a region obtained by imaging the reflected light on the inner peripheral surface 32C of the infrared light I from the manufacturing site, the outer region AR2 has higher luminance than the peripheral region AR1*b* and lower luminance than the manufacturing site region AR1*a*.

Here, the position of the end portion 30A of the layering head 18 in the Z direction is set such that the focus of the image K is within an appropriate range when the distance D2 (the height D1 of the bead B) is within an appropriate range. Therefore, in the case where the distance D2 is out of the appropriate range, the image K captured by the imaging unit 22 becomes an out-of-focus image and becomes a blurred image. FIG. 4 illustrates an example of the image K in which the focus is within an appropriate range because the distance D2 is within an appropriate range.

On the other hand, FIG. 5 illustrates an example of the image K in the case where the height D1 of the bead B becomes lower than the appropriate range and the distance D2 becomes longer than the appropriate range. In such a case, since the imaging unit 22 is separated from the manufacturing site, the infrared light I received from the manufacturing site becomes small, and the image of the manufacturing portion is out of focus. Therefore, in the image K of FIG. 5, the luminance and the area of the manufacturing site region AR1*a* become smaller than those of the image K of FIG. 4.

FIG. 6 illustrates an example of the image K in the case where the height D1 of the bead B becomes higher than the appropriate range and the distance D2 becomes shorter than the appropriate range. In such a case, since the imaging unit 22 approaches the manufacturing site, the infrared light I received from the manufacturing site becomes large, and the image of the manufacturing site is out of focus. Therefore, in the image K of FIG. 6, the luminance and the area of the manufacturing site region AR1*a* are larger than those of the image K of FIG. 4.

As described above, the feature amount of the image K captured by the imaging unit 22 changes according to the distance D2. Specifically, in the image K, the luminance and the area of the manufacturing site region AR1*a* change according to the distance D2. The distance detector 62 according to the present embodiment uses this phenomenon to detect the distance D2 on the basis of the image K, more specifically, on the basis of the luminance of the image K. A more specific description will be given below.

Figure 7:
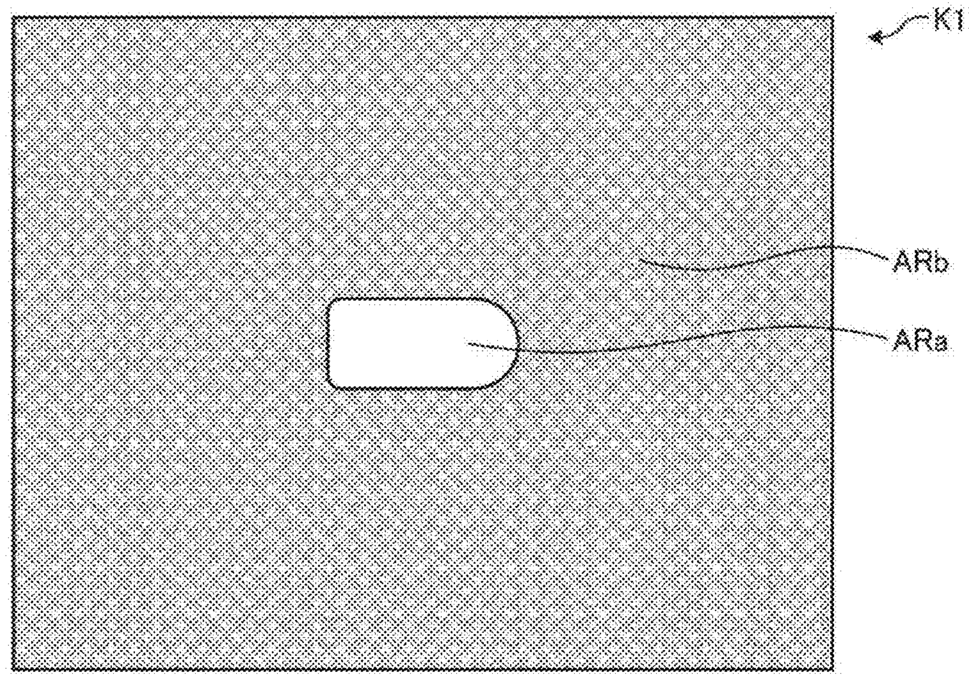
FIG. 7 is a schematic diagram for explaining an example of distance detection according to a first embodiment.

FIG. 7 is a schematic diagram for explaining an example of distance detection according to the first embodiment. The distance detector 62 acquires a luminance value for each pixel of the image K, and executes binarization processing based on the luminance value on the image K. That is, the distance detector 62 sets a luminance threshold, and sets a luminance of a pixel whose luminance value is equal to or larger than the luminance threshold as a first luminance, and sets a luminance of a pixel whose luminance value is equal to or smaller than the luminance threshold as the second luminance. In this case, an image K1, which is the image K subjected to binarization processing, is as illustrated in the example of FIG. 7. That is, the image K1 is an image including a first region ARa having high luminance formed of the pixel having the first luminance and a second region ARb having low luminance formed of the pixel having the second luminance. The first region ARa is a region corresponding to the manufacturing site region AR1*a*. Note that the luminance threshold may be arbitrarily set, and for example, may be a preset fixed value or may be set on the basis of the output of the light beam L. In the case where the luminance threshold is set on the basis of the output of the light beam L, for example, the distance detector 62 preferably sets the luminance threshold higher as the output value of the light beam L is higher.

The distance detector 62 detects the distance D2 on the basis of the area of the first region ARa. An area threshold range is set, and it is determined whether the area of the first region ARa is larger than the area threshold range, within the area threshold range, or smaller than the area threshold range. When the area of the first region ARa is within the area threshold range, the distance detector 62 determines that the distance D2 is within the predetermined threshold range (that is, determines that the height D1 of the bead B is within the appropriate range). When the area of the first region ARa is larger than the area threshold range, the distance detector 62 determines that the distance D2 is shorter than the predetermined threshold range (that is, determines that the height D1 of the bead B is high). When the area of the first region ARa is smaller than the area threshold range, the distance detector 62 determines that the distance D2 is longer than the predetermined threshold range (that is, determines that the height D1 of the bead B is low). Note that the area threshold range here may be arbitrarily set, and for example, may be a preset fixed value or may be set on the basis of the output of the light beam L. In the case where the area threshold range is set on the basis of the output of the light beam L, for example, the distance detector 62 preferably sets the area threshold range higher as the output value of the light beam L is higher.

As described above, the distance detector 62 binarizes the image K with luminance to detect the distance D2, but the method of detecting the distance D2 based on the image K is not limited thereto.

The feedback controller 64 adjusts the feed speed V on the basis of the detection result of the distance D2 by the distance detector 62. When the distance detector 62 determines that the distance D2 is within the predetermined threshold range, the feedback controller 64 maintains the feed speed V without changing the feed speed V. When the distance detector 62 determines that the distance D2 is shorter than the predetermined threshold range, the feedback controller 64 increases the feed speed V. When the distance detector 62 determines that the distance D2 is longer than the predetermined threshold range, the feedback controller 64 decreases the feed speed V. When the distance detector 62 determines that the distance D2 is shorter than the predetermined threshold range, the feedback controller 64 may increase the increase amount of the feed speed V as the distance D2 is shorter, that is, as the area of the first region ARa is larger in this example. When the distance detector 62 determines that the distance D2 is longer than the predetermined threshold range, the feedback controller 64 may increase the decrease amount of the feed speed V as the distance D2 is longer, that is, as the area of the first region ARa is smaller in this example.

Figure 8:
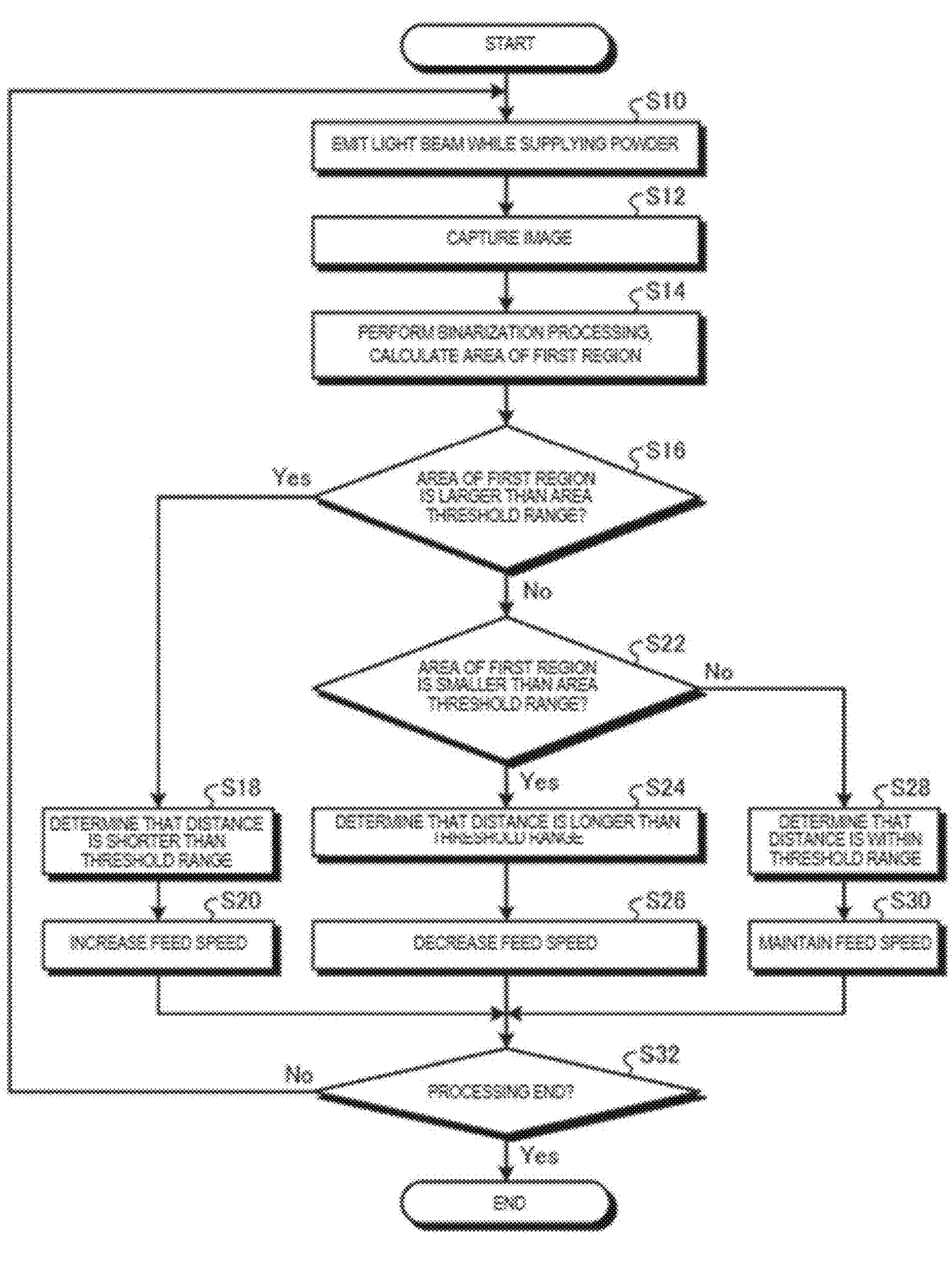
FIG. 8 is a flowchart illustrating a control flow of a feed speed according to the first embodiment.

FIG. 8 is a flowchart illustrating a control flow of a feed speed according to the first embodiment. As illustrated in FIG. 8, the control device 26 controls the layering head 18 to cause the imaging unit 22 to capture the image K (step S12) while causing the powder P to be supplied and emitting the light beam L (step S10). The control device 26 binarizes the image K captured by the imaging unit 22, divides the image K into the first region ARa and the second region ARb, and calculates the area of the first region ARa (step S14). The control device 26 determines whether the area of the first region ARa is larger than the area threshold range (step S16). When the area of the first region ARa is larger than the area threshold range (step S16; Yes), the control device 26 determines that the distance D2 is shorter than the threshold range (step S18), and increases the feed speed V (step S20). On the other hand, when the area of the first region ARa is not wider than the area threshold range (step S16; No), that is, when the area of the first region ARa is equal to or smaller than the area threshold range, the control device 26 determines whether the area of the first region ARa is smaller than the area threshold range (step S22). When the area of the first region ARa is smaller than the area threshold range (step S22; Yes), the control device 26 determines that the distance D2 is longer than the threshold range (step S24), and decreases the feed speed V (step S26). When the area of the first region ARa is not smaller than the area threshold range (step S22; No), that is, when the area of the first region ARa is within the area threshold range, the control device 26 determines that the distance D2 is within the threshold range (step S28), and maintains the feed speed V (step S30). In the case of ending the processing after execution of step S20, S26, or S30 (step S32; Yes), the processing ends. Meanwhile, in the case of not ending the processing (step S32; No), the control device 26 returns to step S10 and continues processing.

As described above, the control device 26 according to the present embodiment determines whether the distance D2 is within the threshold range from the image K, and decreases the feed speed V when the distance D2 is smaller than the threshold range. When the distance D2 is smaller than the threshold range, the height D1 of the bead B is insufficient. Therefore, the control device 26 can increase the height of the bead B by decreasing the feed speed V and increasing the supply amount of the powder P per unit area. On the other hand, the control device 26 increases the feed speed V when the distance D2 is longer than the threshold range. When the distance D2 is longer than the threshold range, the height D1 of the bead B is higher than expected. Therefore, the control device 26 can suppress the height of the bead B from becoming too high by increasing the feed speed V and decreasing the supply amount of the powder P per unit area.

Note that, for example, it is conceivable to adjust the supply amount per unit time of the powder P from the powder storage mechanism (tank) to the layering head 18, but it takes time to reflect the adjustment of the supply amount, and it is difficult to perform quick feedback control. On the other hand, the control device 26 according to the present embodiment can rapidly control the supply amount of the powder P and adjust the height D1 of the bead B by adjusting the feed speed V. Furthermore, the control device 26 according to the present embodiment detects the distance D2 on the basis of the image K, but is not limited to detecting the distance D2 on the basis of the image K. For example, a sensor capable of measuring the distance D2 may be provided, and the distance D2 may be detected from a detection value of the sensor. In this case, any type of sensor is used, and examples thereof include an optical coherence tomograph (OCT) sensor. However, using the image K as in the present embodiment is preferable because the distance D2 can be detected with high accuracy.

The feedback controller 64 controls output of the light beam L on the basis of the image K. The feedback controller 64 controls output of the light beam L on the basis of the luminance value of the image K. In this example, the luminance value of the image K is, for example, a luminance value of the manufacturing site region AR1*a*, and may be an average value of the luminance values of the pixels in the manufacturing site region AR1*a*. The feedback controller 64 maintains the output of the light beam L without changing it in the case where the luminance value of the image K is within a predetermined luminance threshold range, decreases the output of the light beam L in the case where the luminance value of the image K is higher than the predetermined luminance threshold range, and increases the output of the light beam L in the case where the luminance value of the image K is lower than the predetermined luminance threshold range. Furthermore, in the case where the luminance value of the image K is higher than a predetermined luminance threshold range, the feedback controller 64 may increase the reduction amount of the output of the light beam L as the luminance value of the image K is higher. Furthermore, in the case where the luminance value of the image K is lower than a predetermined luminance threshold range, the feedback controller 64 may increase the increase amount of the output of the light beam L as the luminance value of the image K is lower. Note that the luminance threshold range in this example may be arbitrarily set, and for example, may be a preset fixed value or may be set on the basis of the distance D2. In the case where the luminance threshold range is set on the basis of the distance D2, for example, the distance detector 62 preferably sets the luminance threshold range higher as the distance D2 is shorter.

Figure 9:
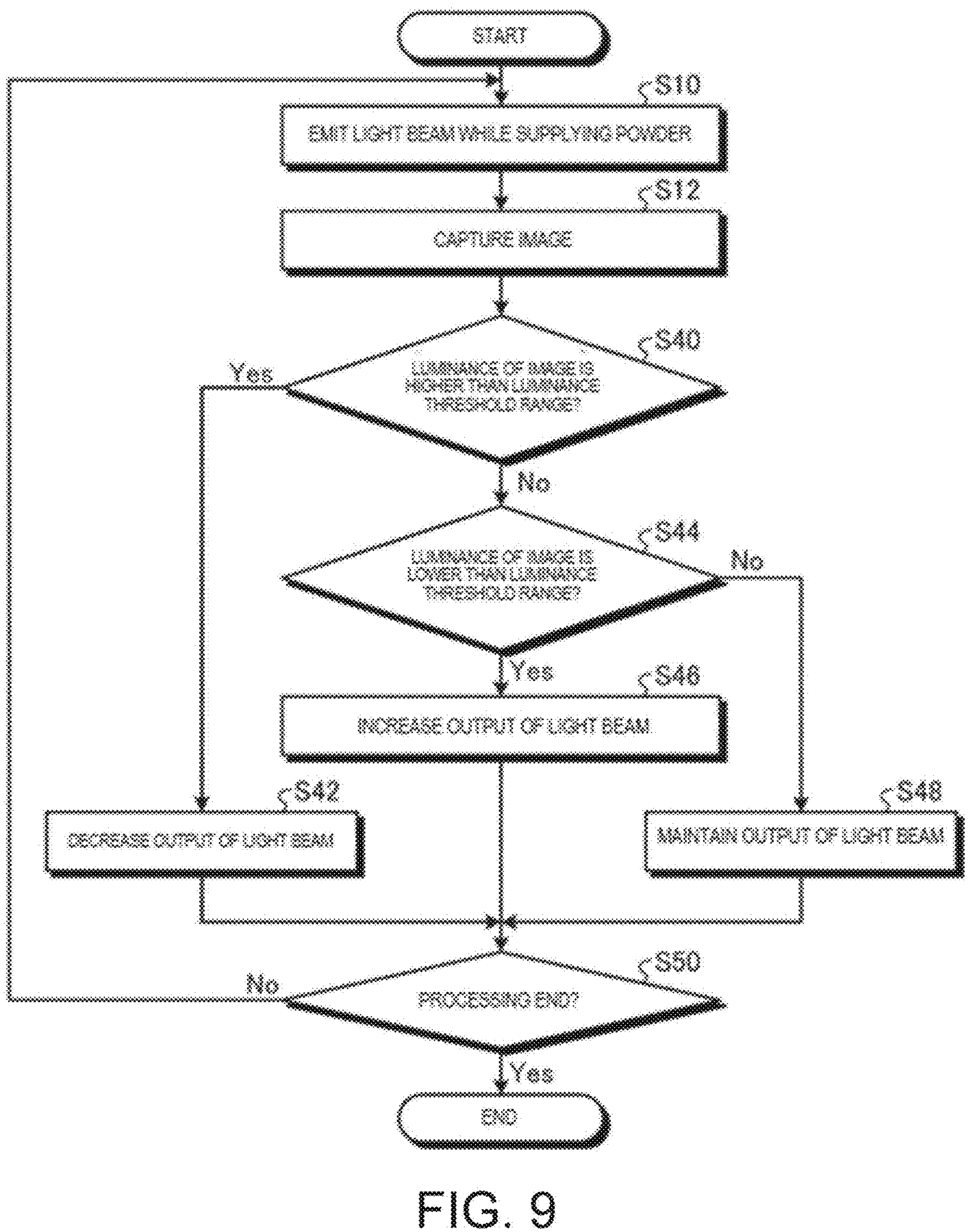
FIG. 9 is a flowchart illustrating a control flow of an output of a light beam.

FIG. 9 is a flowchart illustrating a control flow of output of a light beam. As illustrated in FIG. 9, the control device 26 controls the layering head 18 to cause the imaging unit 22 to capture the image K (step S12) while causing the powder P to be supplied and emitting the light beam L (step S10). The control device 26 determines whether the luminance of the image K captured by imaging unit 22 is higher than the luminance threshold range (step S40). When the luminance of the image K is higher than the luminance threshold range (step S40; Yes), the control device 26 decreases the output of the light beam L (step S42). On the other hand, when the luminance of the image K is not higher than the luminance threshold range (step S40; No), that is, when the luminance of the image K is equal to or lower than the luminance threshold range, the control device 26 determines whether the luminance of the image K is lower than the luminance threshold range (step S44). When the luminance of the image K is lower than the luminance threshold range (step S44; Yes), the control device 26 increases the output of the light beam L (step S46). On the other hand, when the luminance of the image K is not lower than the luminance threshold range (step S44; No), that is, when the luminance of the image K is within the luminance threshold range, the control device 26 maintains the output of the light beam L (step S48). In the case of ending the processing after execution of step S42, S46, or S48 (step S50; Yes), the processing ends. Meanwhile, in the case of not ending the processing (step S50; No), the control device 26 returns to step S10 and continues processing.

As described above, the control device 26 according to the present embodiment increases the output of the light beam L when the luminance of the image K is smaller than the luminance threshold range. When the luminance of the image K is smaller than the luminance threshold range, since the powder P is not appropriately melted, the height of the bead B can be increased by increasing the output of the light beam L to appropriately melt the powder P. On the other hand, when the luminance of the image K is higher than the luminance threshold range, the control device 26 decreases the output of the light beam L. When the luminance of the image K is higher than the luminance threshold range, since the melting of the powder P has progressed too much, it is possible to suppress the height of the bead B from becoming too high by lowering the output of the light beam L to appropriately perform the melting. However, the output control of the light beam L is not essential, and the manufacturing accuracy can be improved by appropriately maintaining the height of the bead B by controlling at least the feed speed V.

Figure 10:
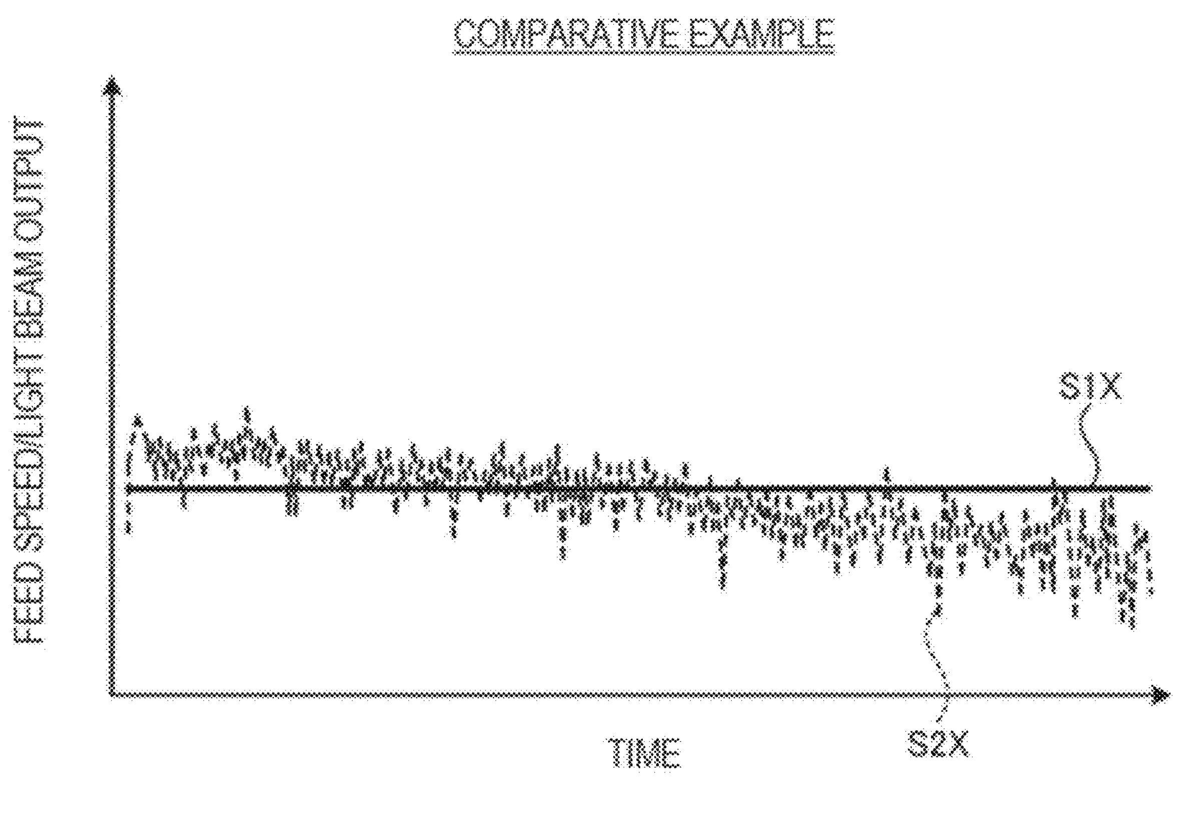
FIG. 10 is a graph illustrating an example of a change in a feed speed and an output of a light beam for each time according to a comparative example.
Figure 11:
FIG. 11 is a graph illustrating an example of a change in a feed speed and an output of a light beam for each time according to the present embodiment.
Figure 11:
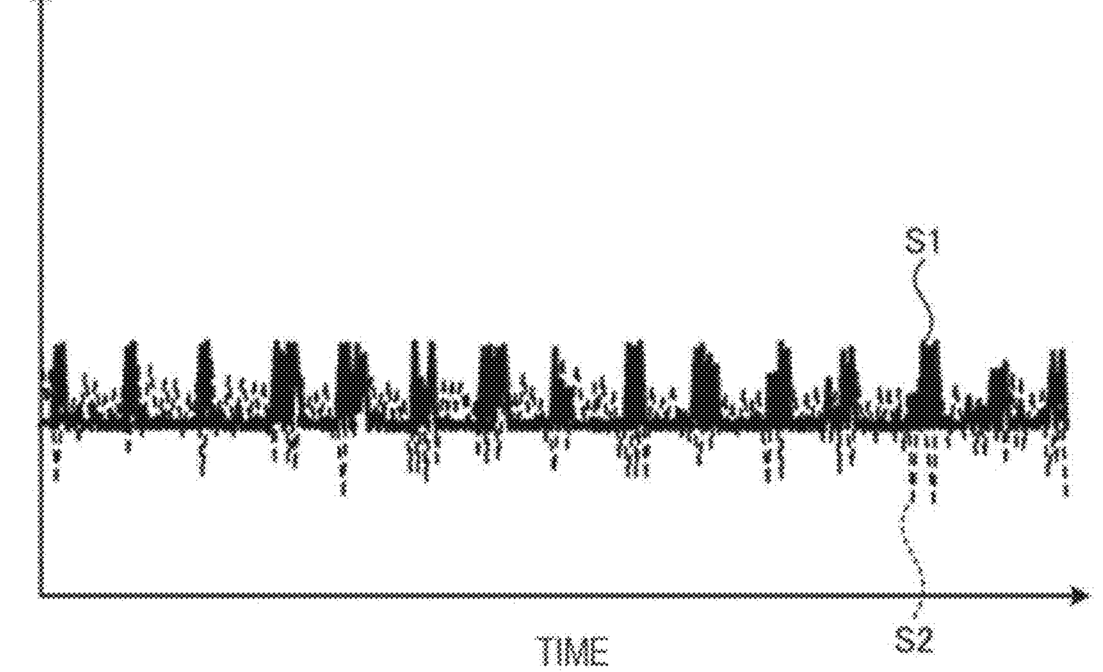

FIG. 10 is a graph illustrating an example of a change in the feed speed and the output of the light beam for each time according to a comparative example, and FIG. 11 is a graph illustrating an example of a change in the feed speed and the output of the light beam for each time according to the present embodiment. In the comparative example, the output of the light beam L is controlled, but the feed speed V is not controlled and is kept constant. In the present embodiment, both the output of the light beam L and the feed speed V are controlled. A line segment S1X in FIG. 10 indicates the feed speed V for each time in the comparative example, and a line segment S2X indicates the output of the light beam L for each time in the comparative example. A line segment S1 in FIG. 11 indicates the feed speed V for each time in the present embodiment, and a line segment S2 indicates the output of the light beam L for each time in the present embodiment.

The height D1 of the bead B can be appropriately adjusted to some extent by adjusting the output of the light beam L as illustrated in FIG. 10, but the height D1 of the bead B can be more appropriately adjusted and the manufacturing accuracy can be improved by also controlling the feed speed V as illustrated in FIG. 11. Furthermore, by controlling the feed speed V as illustrated in FIG. 11, it is also possible to suppress a decrease in the output of the light beam L even when the output of the light beam L is controlled. Even when the feed speed V is controlled without adjusting the output of the light beam L, the height D1 of the bead B can be more appropriately adjusted than when the output of the light beam L is adjusted. However, by adjusting both the feed speed V and the output of the light beam L, the height D1 of the bead B can be more appropriately maintained, and the width of the bead B can also be appropriately maintained.

The feedback controller 64 detects the temperature of the manufacturing site on the basis of the image K. The feedback controller 64 detects the temperature of the manufacturing site from the luminance of the image K. For example, the feedback controller 64 determines that the temperature of the manufacturing site is higher as the luminance of the image K is higher. The feedback controller 64 determines whether to continue or stop manufacturing on the basis of the detection result of the temperature of the manufacturing site. When the temperature of the manufacturing site is equal to or lower than a predetermined threshold temperature, the feedback controller 64 continues manufacturing, that is, emission of the light beam L, discharge of the powder P, and feeding in the feeding direction D. On the other hand, when the temperature of the manufacturing site is higher than the predetermined threshold temperature, the feedback controller 64 stops manufacturing, that is, emission of the light beam L, discharge of the powder P, and feeding in the feeding direction D. Thereafter, when the temperature of the manufacturing site falls to the predetermined threshold temperature or lower, the feedback controller 64 resumes manufacturing.

Figure 12:
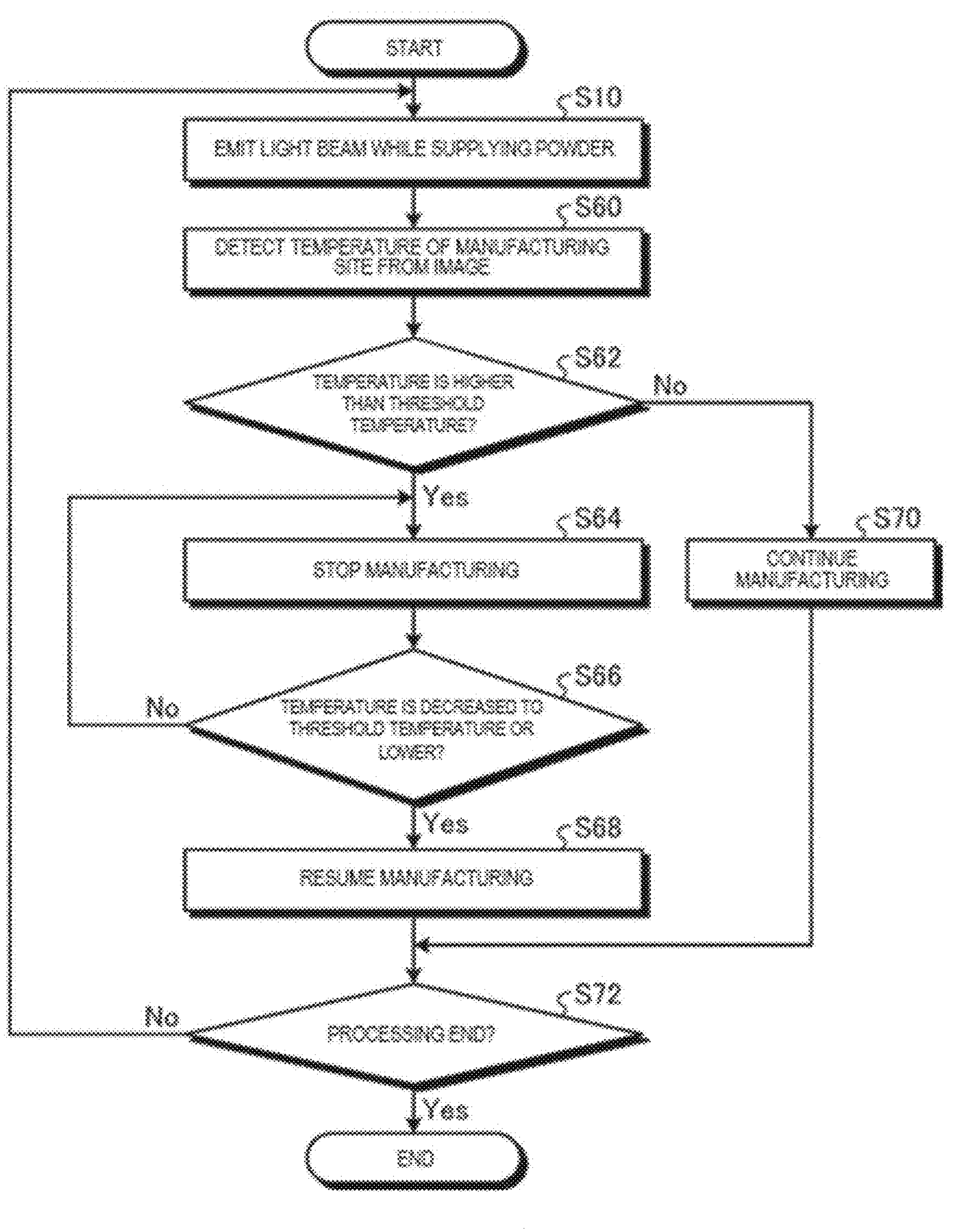
FIG. 12 is a flowchart illustrating a stop determination flow of manufacturing.

FIG. 12 is a flowchart illustrating a stop determination flow of manufacturing. As illustrated in FIG. 12, the control device 26 controls the layering head 18 to emit the light beam L while causing the powder P to be supplied (step S10), and detects the temperature of the manufacturing site from the luminance of the image K captured by the imaging unit 22 (step S60). The control device 26 determines whether the temperature of the manufacturing site is higher than the threshold temperature (step S62), and when the temperature of the manufacturing site is higher than the threshold temperature (step S62; Yes), the control device 26 stops manufacturing (step S64). The control device 26 continues imaging by the imaging unit 22 and the temperature detection of the manufacturing site, and when the temperature of the manufacturing site has decreased to the threshold temperature or lower (step S66; Yes), resumes manufacturing (step S68). On the other hand, when the temperature of the manufacturing site does not decrease to the threshold temperature or lower (step S66; No), that is, when the temperature of the manufacturing site is equal to or higher than the threshold temperature, the process returns to step S64 and continues to stop manufacturing. Furthermore, when the temperature of the manufacturing site is not higher than the threshold temperature (step S62; No), the control device 26 continues manufacturing (step S70). Then, In the case where the processing is ended (step S72; Yes), or in the case where this processing is ended but processing is not ended (step S72; No), the process returns to step S10 and continues processing.

Thus, the control device 26 according to the present embodiment can appropriately increase the manufacturing accuracy by also monitoring the temperature of the manufacturing site. Furthermore, since the control device 26 adjusts the feed speed V and the output of the light beam L, it is effective to determine the manufacturing stop on the basis of the temperature of the manufacturing site as described above in preparation for the case where the feed speed V decreases or the output of the light beam L increases. However, this control based on the temperature of the manufacturing site is not essential.

As described above, the three-dimensional additive manufacturing device 1 manufactures the layered structure A by supplying the powder P for manufacturing the layered structure A while changing the positional relationship between the powder discharge port 34B from which the powder is discharged, described below, and the layered structure A. The three-dimensional additive manufacturing device 1 includes: the powder supply unit (layering head 18 in the present embodiment) that supplies powder P from the discharge port (powder discharge port 34B) toward the layered structure A; the light irradiation unit (layering head 18 in the present embodiment) that irradiates the powder P with a light beam L to melt and harden the powder P to thereby manufacture the layered structure A; the imaging unit 22 that captures the image K of the manufacturing site where the layered structure A is being manufactured; the distance detector 62 that detects the distance D2 from the manufacturing site to the powder supply unit on the basis of the image K; and the feedback controller 64 that adjusts the moving speed (feed speed V) of the powder supply unit relative to the layered structure A on the basis of the detection result of the distance D2. The three-dimensional additive manufacturing device 1 according to the present embodiment estimates the height D1 of the bead B by detecting the distance D2, and adjusts the feed speed V from the detection result of the distance D2. Thereby, it is possible to appropriately maintain the height D1 of the bead B and appropriately improve the manufacturing accuracy. Further, since the distance D2 is detected from the image K, the detection accuracy of the distance D2 can be increased, and the manufacturing accuracy can be more appropriately improved. Furthermore, by adjusting the feed speed V, quick feedback control can be performed.

The feedback controller 64 adjusts the moving speed in a direction orthogonal to the layering direction (Z direction) of the layered structure A (feeding direction D) on the basis of the detection result of the distance D2. The three-dimensional additive manufacturing device 1 according to the present embodiment adjusts the feed speed V in the feeding direction D. Thereby, it is possible to appropriately maintain the height D1 of the bead B and appropriately improve the manufacturing accuracy.

The feedback controller 64 decreases the moving speed (feed speed V) when the distance D2 is longer than a predetermined threshold range, and increases the moving speed (feed speed V) when the distance D2 is shorter than the predetermined threshold range. Since the three-dimensional additive manufacturing device 1 according to the present embodiment adjusts the feed speed V as described above, it is possible to appropriately maintain the height D1 of the bead B and appropriately improve the manufacturing accuracy.

Furthermore, the distance detector 62 detects the distance D2 on the basis of the area of the region in which the molten pool M formed of the molten powder P (manufacturing site region AR1*a*) is captured in the image K. Since the three-dimensional additive manufacturing device 1 according to the present embodiment detects the distance D2 as described above, it is possible to enhance the detection accuracy of the distance D2 and appropriately improve the manufacturing accuracy.

The distance detector 62 executes binarization processing based on luminance on the image K to divide the image K into a first region ARa having high luminance and a second region ARb having luminance lower than that of the first region ARa, and detects the distance D2 on the basis of the area of the first region ARa. Since the three-dimensional additive manufacturing device 1 according to the present embodiment detects the distance D2 as described above, it is possible to enhance the detection accuracy of the distance D2 and appropriately improve the manufacturing accuracy.

In addition, the distance detector 62 determines that the distance D2 is longer than a predetermined threshold range when the area of the first region ARa is smaller than a predetermined area threshold range, and determines that the distance D2 is shorter than the predetermined threshold range when the area of the first region ARa is larger than the area threshold range. The feedback controller 64 decreases the moving speed (feed speed V) when the distance D2 is longer than the predetermined threshold range, and increases the moving speed (feed speed V) when the distance D2 is shorter than the predetermined threshold range. Since the three-dimensional additive manufacturing device 1 according to the present embodiment detects the distance D2 as described above, it is possible to enhance the detection accuracy of the distance D2 and appropriately improve the manufacturing accuracy.

The feedback controller 64 controls output of the light beam L on the basis of the image K. The three-dimensional additive manufacturing device 1 according to the present embodiment adjusts the output of the light beam L in addition to the feed speed V. Therefore, it is possible to appropriately improve the manufacturing accuracy.

In addition, the control method according to the present embodiment controls the three-dimensional additive manufacturing device 1 including the powder supply unit (layering head 18 in the present embodiment) that supplies the powder P and the light irradiation unit (layering head 18 in the present embodiment) that irradiates the powder P with the light beam L to melt and harden the powder P to thereby manufacture the layered structure A. The present control method includes the steps of capturing the image K of a manufacturing site where the layered structure A is being manufactured, detecting the distance D2 from the manufacturing site to the powder supply unit on the basis of the image K, and adjusting the moving speed (feed speed V) of the powder supply unit relative to the layered structure A on the basis of the distance D2. According to the present control method, the manufacturing accuracy can be appropriately improved.

In addition, the program according to the present embodiment causes a computer to execute a control method for controlling the three-dimensional additive manufacturing device 1 including the powder supply unit (layering head 18 in the present embodiment) that supplies the powder P and the light irradiation unit (layering head 18 in the present embodiment) that irradiates the powder P with the light beam L to melt and harden the powder P to thereby manufacture the layered structure A. The present program causes a computer to execute the steps of capturing the image K of a manufacturing site where the layered structure A is being manufactured; detecting the distance D2 from the manufacturing site to the powder supply unit on the basis of the image K; and adjusting the moving speed (feed speed V) of the powder supply unit relative to the layered structure A on the basis of the distance D2. According to the present program, the manufacturing accuracy can be appropriately improved.

Next, a second embodiment of the present disclosure will be described. The second embodiment is different from the first embodiment in a method of detecting the distance D2 based on the image K. In the second embodiment, description of parts having the same configuration as that of the first embodiment will be omitted.

As described in the first embodiment, the image K captured by the imaging unit 22 includes the inner region AR1 in which an image of a manufacturing site inside the light beam emission port 32B is captured and the outer region AR2 in which an image of the inner peripheral surface 32C is captured (see FIG. 4). The outer region AR2 is an image of the infrared light I reflected by the inner peripheral surface 32C. Therefore, when the distance D2 increases, the intensity of the infrared light I reflected on the inner peripheral surface 32C received by the imaging unit 22 decreases, and thus the luminance of the outer region AR2 decreases. When the distance D2 decreases, the intensity of the infrared light I received by the imaging unit 22 increases, and thus the luminance of the outer region AR2 increases. The distance detector 62 of the control device 26 according to the second embodiment uses this phenomenon to detect the distance D2 on the basis of the inner region AR1 and the outer region AR2, more specifically, on the basis of the luminance of the inner region AR1 and the luminance of the outer region AR2. The luminance of the inner region AR1 may be the entire luminance of the inner region AR1 or the luminance of the manufacturing site region AR1*a* including the manufacturing site. Furthermore, the luminance of the inner region AR1 may be an average value of the luminance for each pixel of the entire inner region AR1 or the manufacturing site region AR1*a*, or may be a maximum value of the luminance for each pixel. That is, the luminance of the inner region AR1 may be a value based on the luminance of the manufacturing site region AR1*a* (manufacturing site). Furthermore, the luminance of the outer region AR2 may be an average value of the luminance for each pixel of the outer region AR2, or may be a maximum value of the luminance for each pixel. That is, the luminance of the outer region AR2 may be a value based on the luminance of the outer region AR2 (inner peripheral surface 32C).

More specifically, the distance detector 62 detects the distance D2 on the basis of the ratio between the luminance of the inner region AR1 in which the manufacturing site is captured and the luminance of the outer region AR2 in which the nozzle inner peripheral surface is captured. The distance detector 62 calculates a luminance ratio that is a ratio of the luminance of outer region AR2 to the luminance of inner region AR1, and detects the distance D2 on the basis of the luminance ratio. The distance detector 62 determines whether the luminance ratio is larger than a ratio threshold range, is within the ratio threshold range, or is smaller than the ratio threshold range. When the luminance ratio is within the ratio threshold range, the distance detector 62 determines that the distance D2 is within the predetermined threshold range (that is, determines that the height D1 of the bead B is within the appropriate range). When the luminance ratio is larger than the ratio threshold range, the distance detector 62 determines that the distance D2 is shorter than the predetermined threshold range (that is, determines that the height D1 of the bead B is high). When the luminance ratio is smaller than the ratio threshold range, the distance detector 62 determines that the distance D2 is longer than the predetermined threshold range (that is, determines that the height D1 of the bead B is high). Note that the ratio threshold range in this example may be arbitrarily set, and for example, may be a preset fixed value.

When the distance detector 62 determines that the distance D2 is within the predetermined threshold range, the feedback controller 64 maintains the feed speed V without changing the feed speed V. When the distance detector 62 determines that the distance D2 is shorter than the predetermined threshold range, the feedback controller 64 increases the feed speed V. When the distance detector 62 determines that the distance D2 is longer than the predetermined threshold range, the feedback controller 64 decreases the feed speed V. When the distance detector 62 determines that the distance D2 is shorter than the predetermined threshold range, the feedback controller 64 may increase the increase amount of the feed speed V as the distance D2 is shorter, that is, as the luminance ratio is larger in this example. When the distance detector 62 determines that the distance D2 is longer than the predetermined threshold range, the feedback controller 64 may increase the decrease amount of the feed speed V as the distance D2 is longer, that is, as the luminance ratio is smaller in this example.

In the second embodiment, since the distance D2 is detected from the luminance ratio of the outer region AR2 with respect to the luminance of the inner region AR1 as described above, the detection accuracy of the distance D2 can be increased to appropriately improve the manufacturing accuracy. Furthermore, since the luminance of the outer region AR2 also depends on the output of the light beam L, there is a possibility that the distance D2 cannot be appropriately detected only by the luminance of the outer region AR2. However, in the present embodiment, since the luminance of the inner region AR1 depending on the output of the light beam L is also used, the influence of the output of the light beam L can be reduced, and the detection accuracy of the distance D2 can be increased.

Figure 13:
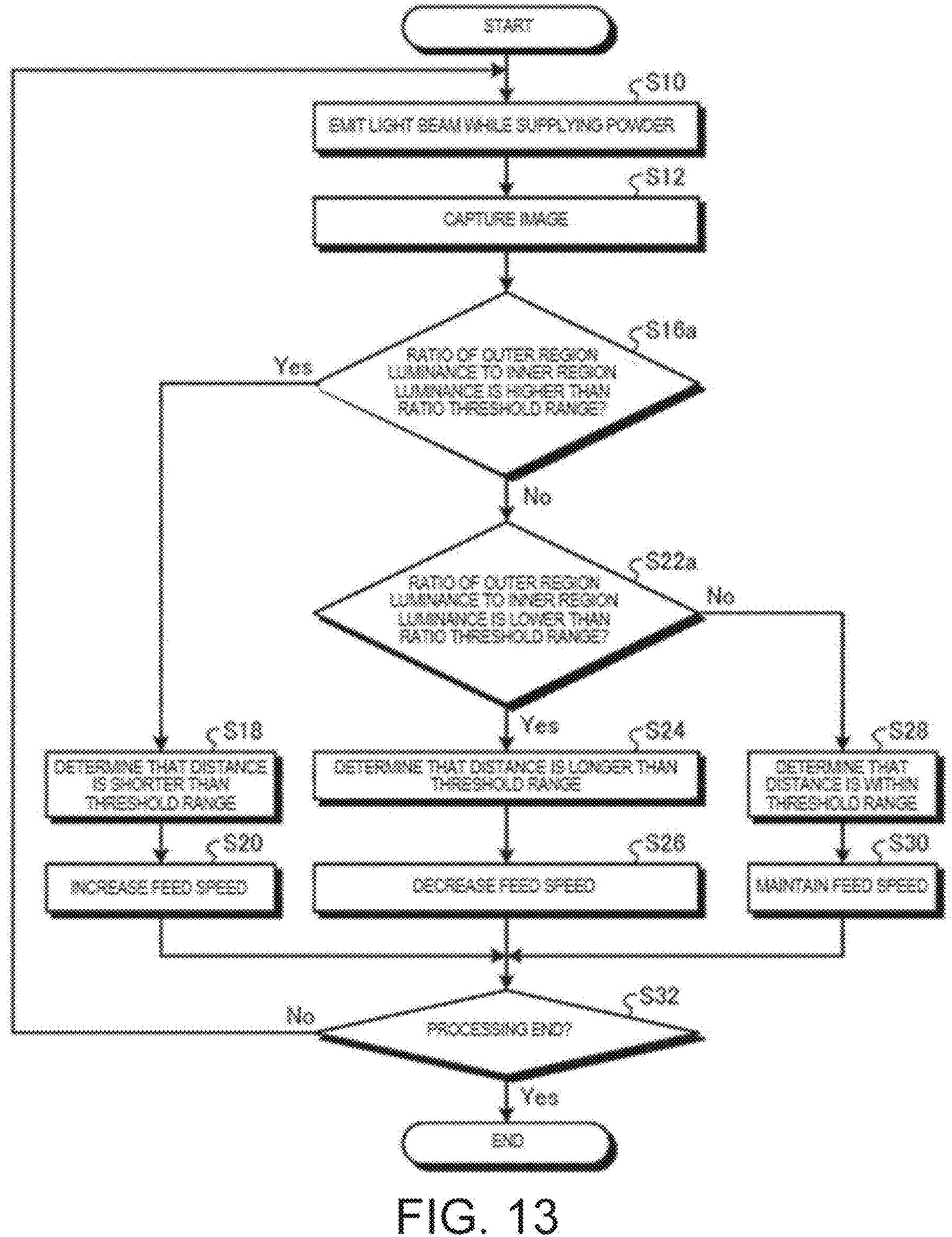
FIG. 13 is a flowchart illustrating a control flow of a feed speed according to a second embodiment.

FIG. 13 is a flowchart illustrating a control flow of a feed speed according to the second embodiment. As illustrated in FIG. 13, the control device 26 controls the layering head 18 to cause the imaging unit 22 to capture the image K (step S12) while causing the powder P to be supplied and emitting the light beam L (step S10). The control device 26 determines whether the luminance ratio that is the ratio of the luminance of the outer region AR2 to the luminance of the inner region AR1 of the image K is higher than the ratio threshold range (step S16*a*). When the luminance ratio is higher than the ratio threshold range (step S16*a*; Yes), the control device 26 determines that the distance D2 is shorter than the threshold range (step S18), and increases the feed speed V (step S20). On the other hand, when the luminance ratio is not higher than the ratio threshold range (step S16*a*; No), that is, when the luminance ratio is equal to or lower than the ratio threshold range, the control device 26 determines whether the luminance ratio is lower than the ratio threshold range (step S22*a*). When the luminance ratio is lower than the ratio threshold range (step S22*a*; Yes), the control device 26 determines that the distance D2 is longer than the threshold range (step S24), and decreases the feed speed V (step S26). When the luminance ratio is not lower than the ratio threshold range (step S22*a*; No), that is, when the luminance ratio is within the ratio threshold range, the control device 26 determines that the distance D2 is within the threshold range (step S28), and maintains the feed speed V (step S30). In the case of ending the processing after execution of step S20, S26, or S30 (step S32; Yes), the processing ends. Meanwhile, in the case of not ending the processing (step S32; No), the control device 26 returns to step S10 and continues processing.

As described above, the light irradiation unit (the layering head 18 in the present embodiment) includes a tube (the inner tube 32) in which the light beam emission port 32B from which the light beam L is emitted is formed. The imaging unit 22 captures the image K including the manufacturing site and the inner peripheral surface 32C around the light beam emission port 32B of the tube. The distance detector 62 detects the distance D2 on the basis of the region (inner region AR1) in which the manufacturing site is captured and the region (outer region AR2) in which the inner peripheral surface 32C is captured, in the image K. According to the three-dimensional additive manufacturing device 1 of the present embodiment, since the distance D2 is detected on the basis of the inner region AR1 and the outer region AR2, the detection accuracy of the distance D2 can be increased and the manufacturing accuracy can be appropriately improved.

Further, the distance detector 62 detects the distance D2 on the basis of the ratio between the luminance of the region (inner region AR1) in which the manufacturing site is captured and the luminance of the region (outer region AR2) in which the inner peripheral surface 32C is captured, in the image K. According to the three-dimensional additive manufacturing device 1 of the present embodiment, since the distance D2 is detected on the basis of the ratio between the luminance of the inner region AR1 and the luminance of the outer region AR2, the detection accuracy of the distance D2 can be increased and the manufacturing accuracy can be appropriately improved.

While the embodiments of the present disclosure have been described above, the embodiments are not limited to the contents described above. In addition, the above-described constituent elements include those that can be easily assumed by those skilled in the art, those that are substantially the same, and those in a so-called equivalent range. Furthermore, the above-described constituent elements can be appropriately combined. Furthermore, various omissions, substitutions, or changes in the constituent elements can be made without departing from the gist of the above-described embodiments.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A three-dimensional additive manufacturing device for manufacturing a layered structure by supplying powder for manufacturing the layered structure while changing a positional relationship between a discharge port from which the powder is discharged and the layered structure, the device comprising:

- a powder supply unit that supplies powder from the discharge port toward the layered structure;
- a light irradiation unit that irradiates the powder with a light beam to melt and harden the powder to manufacture the layered structure;
- an imaging unit that captures an image of a manufacturing site where the layered structure is being manufactured;
- a distance detector that detects a distance from the manufacturing site to the powder supply unit on a basis of the image; and
- a feedback controller that adjusts a moving speed of the powder supply unit relative to the layered structure on a basis of a detection result of the distance;
- wherein the distance detector executes binarization processing based on luminance on the image to divide the image into a first region having higher luminance, in which a molten pool formed of melted powder is captured in the image, and a second region having luminance lower than the luminance of the first region and detects the distance on a basis of an area of the first region.

2. The three-dimensional additive manufacturing device according to claim 1, wherein the feedback controller adjusts the moving speed in a direction orthogonal to a layering direction of the layered structure on the basis of the detection result of the distance.

3. The three-dimensional additive manufacturing device according to claim 2, wherein the feedback controller decreases the moving speed when the distance is longer than a predetermined threshold range, and increases the moving speed when the distance is shorter than the predetermined threshold range.

4. The three-dimensional additive manufacturing device according to claim 1, wherein the distance detector determines that the distance is longer than a predetermined threshold range when the area of the first region is smaller than a predetermined area threshold range, and determines that the distance is shorter than the predetermined threshold range when the area of the first region is larger than the area threshold range, and the feedback controller decreases the moving speed when the distance is longer than the predetermined threshold range, and increases the moving speed when the distance is shorter than the predetermined threshold range.

5. The three-dimensional additive manufacturing device according to claim 1, wherein the light irradiation unit includes a tube in which a light beam emission port from which the light beam is emitted is formed, the imaging unit captures the image including the manufacturing site and an inner peripheral surface around the light beam emission port of the tube, and the distance detector detects the distance on a basis of a region in which the manufacturing site is captured and a region in which the inner peripheral surface is captured in the image.

6. The three-dimensional additive manufacturing device according to claim 1, wherein the feedback controller adjusts output of the light beam on a basis of the image.

7. A control method for controlling a three-dimensional additive manufacturing device, the device including a powder supply unit that supplies powder and a light irradiation unit that irradiates the powder with a light beam to melt and harden the powder to form a layered structure; the method comprising the steps of:

capturing an image of a manufacturing site where the layered structure is being manufactured;

executing binarization processing based on luminance on the image to divide the image into a first region having higher luminance, in which a molten pool formed of melted powder is captured in the image, and a second region having luminance lower than the luminance of the first region;

detecting a distance from the manufacturing site to the powder supply unit on a basis of an area of the first region; and adjusting a moving speed of the powder supply unit relative to the layered structure on a basis of the distance.

8. A non-transitory computer readable medium for causing a computer to execute a control method for controlling a three-dimensional additive manufacturing device, the device including a powder supply unit that supplies powder and a light irradiation unit that irradiates the powder with a light beam to melt and harden the powder to form a layered structure; the medium causing the computer to execute the steps of:

capturing an image of a manufacturing site where the layered structure is being manufactured;

executing binarization processing based on luminance on the image to divide the image into a first region having higher luminance, in which a molten pool formed of melted powder is captured in the image, and a second region having luminance lower than the luminance of the first region;

detecting a distance from the manufacturing site to the powder supply unit on a basis of an area of the first region; and adjusting a moving speed of the powder supply unit relative to the layered structure on a basis of the distance.

9. The three-dimensional additive manufacturing device according to claim 5, wherein the distance detector detects the distance on a basis of a ratio between luminance of the region in which the manufacturing site is captured and luminance of the region in which the inner peripheral surface is captured in the image.

* * * * *